Aug. 23, 1960   W. W. DRUMMOND ET AL   2,949,633
APPARATUS USED IN THE PRODUCTION OF GLASS FIBERS
Filed Dec. 31, 1956                    2 Sheets-Sheet 1
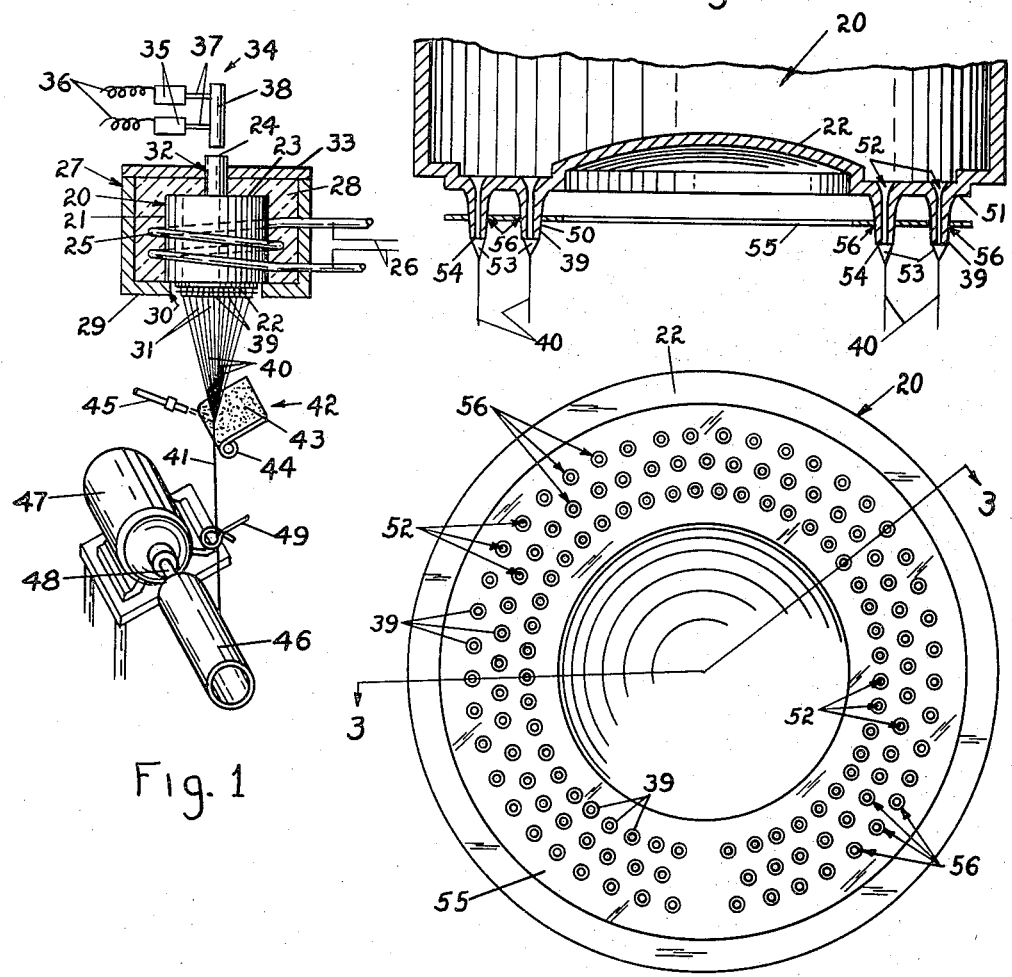

Aug. 23, 1960 W. W. DRUMMOND ET AL 2,949,633
APPARATUS USED IN THE PRODUCTION OF GLASS FIBERS
Filed Dec. 31, 1956 2 Sheets-Sheet 2
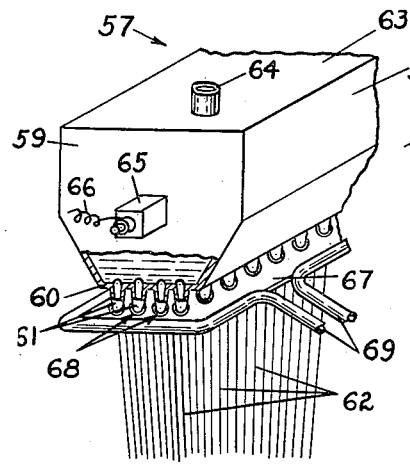
Fig. 4
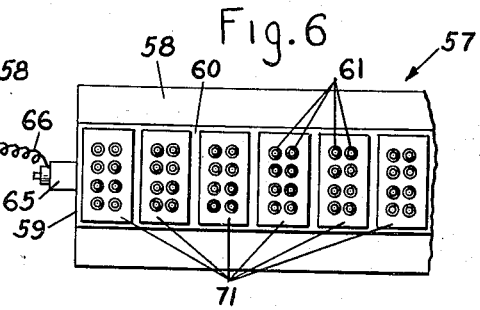
Fig. 6
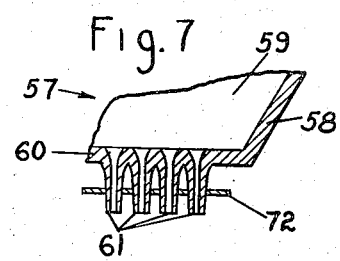
Fig. 7
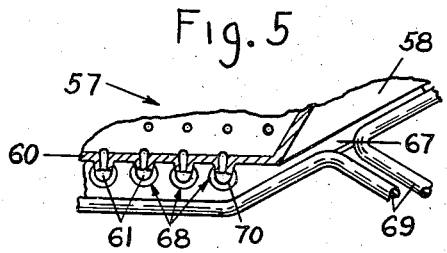
Fig. 5
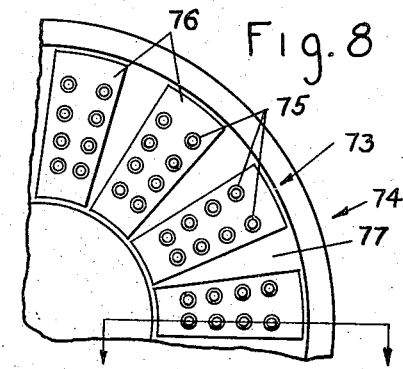
Fig. 8
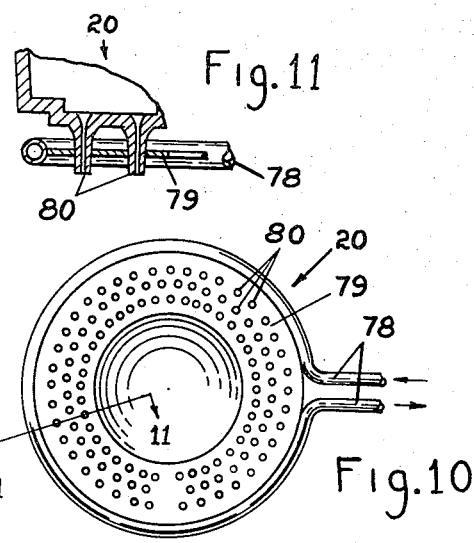
Fig. 11
Fig. 10
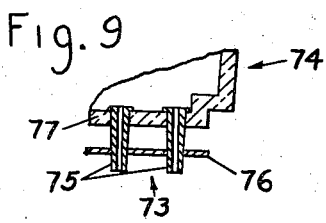
Fig. 9
INVENTORS
Warren W. Drummond,
William B. Hulthorst
BY and Jesse H. Plummer
Nobbe & Swope
ATTORNEYS United States Patent Office 2,949,633
Patented Aug. 23, 1960

2,949,633
APPARATUS USED IN THE PRODUCTION OF GLASS FIBERS

Warren Wendell Drummond, Bowling Green, William B. Hullhorst, Rossford, and Jesse H. Plummer, Toledo, Ohio, assignors to L.O.F. Glass Fibers Company, Toledo, Ohio, a corporation of Ohio Filed Dec. 31, 1956, Ser. No. 631,866

16 Claims. (Cl. 18—8)

This invention relates to the production of glass fibers and more specifically to a glass melting chamber for producing continuous glass fibers.

Continuous glass fibers as used in the weaving of cloth and for other purposes are produced by a process which comprises establishing a body of molten glass in a melting chamber which is provided in its base with one or more small apertures or tips through which the molten glass is exuded as small streams. These small streams are drawn out or attenuated into fibers of very fine diameter and continuous length. The fibers are gathered into a strand and wound as such upon a rapidly rotating spool which provides the attenuating force.

It will be seen, however, as the molten streams are greatly reduced in diameter while being attenuated at speeds from 8,000 to 20,000 lineal feet per minute, that extremely careful control is required to prevent breakage of the fibers. Thus careful regulation of the temperature of the glass being exuded from the tips is required. Also control of air disturbances around the tips and more importantly of heat radiation both to and from the tips is required.

One of the problems in drawing or attenuating glass fibers is the establishment of a rapid and extremely carefully regulated cooling rate within a short distance on the order of about ¼ to ½ inch as the glass streams exude from the melting chamber. One method heretofore used to accomplish this result has been to utilize a tip made of heat radiating material such as metal, and allowing the glass to cool as it flows therethrough. The radiation is outward to the atmosphere or to some cooler body. Thus the metal tips would radiate outwardly and thereby cool the glass as it passed therethrough. However, since the tips are placed in close proximity to the bottom of the glass melting chamber which itself is a high producer of radiant heat energy, it will be seen that a high intensity radiant energy field is set up in the "cone" area wherein the molten glass streams are elongated into fibers. The result is that many fiber burn offs are caused by the intense radiation which is sufficiently great to cause the fibers to separate by remelting.

The purpose of this invention is to reduce the radiation from the bottom of the melting chamber to the fiber forming area, and thereby increase as well as render more uniform the cone cooling rate. This is accomplished by placing a heat radiation shield between the bottom of the melting chamber and the ends of the tips, through which the glass is exuded from the chamber. The radiation shield is a thin plate member fabricated of a material which has high heat reflectivity and low heat emissivity. The shield acts to reflect heat back into the glass melting chamber and at the same time reduces radiation to the cone area.

Accordingly, it is an important object of the present invention to provide an improved glass melting chamber for the production of glass fibers.

It is another important object to provide an improved glass melting chamber wherein greater cone cooling and more uniform cone cooling are provided.

It is a further object to provide a glass melting chamber for the production of glass fibers in which improved cone cooling is provided by means of a heat radiation shield positioned between the wall of the glass melting chamber and the ends of the tips provided in and extending from such wall.

Other objects and advantages of the invention will become more apparent during the course of the following description when taken in connection with the accompanying drawings.

In the drawings wherein like numerals are employed to designate like parts throughout the same:

Fig. 1 is a perspective view with some parts shown in section for clarity showing apparatus useful for the production of continuous glass fibers;

Fig. 2 is a bottom plan view of a circular glass melting chamber adapted to be employed in Fig. 1, and made in accordance with the present invention;

Fig. 3 is a sectional view taken along the line 3—3 of Fig. 2;

Fig. 4 is a perspective view wtih some parts shown in section for clarity of a rectangular glass melting chamber made in accordance with the present invention;

Fig. 5 is an enlarged fragmentary section of a melting chamber of either circular or rectangular configuration showing the use of cement for electrically and thermally insulating a radiant energy shield from the tips;

Fig. 6 is a bottom plan view of a modification of the present invention as applied to a rectangular glass melting chamber of the type shown in Fig. 4;

Fig. 7 is a fragmentary section of a radiant energy shield fitted in contacting relation to the tips of the glass melting chamber of Fig. 6;

Fig. 8 is a fragmentary bottom plan view of a circular glass melting chamber fabricated of a clay refractory and having a segmented heat radiation shield;

Fig. 9 is a fragmentary section view taken along line 9—9 of Fig. 8;

Fig. 10 is a bottom plan view of a circular melting chamber having an annular heat reflecting shield with a fluid cooled coil attached to the periphery thereof; and Fig. 11 is a section taken along the line 11—11 of Fig. 10.

As shown in Fig. 1 there is illustrated an apparatus adapted for the production of continuous glass fibers which includes a glass melting pot 20 fabricated of circular section and suitably made from a high temperature-resistant precious metal alloy. The pot 20 includes a side wall 21 of cylindrical configuration and having its axis vertically disposed. A circular base 22 is joined to the bottom of the side wall 21 and the pot is covered with a circular top 23 which is provided with an inlet opening 24 extending vertically upwardly for the receipt of glass materials.

The melting pot 20 is encircled by a heating coil 25 adapted to be energized with high frequency electricity fed thereinto by lines 26. The melting pot is positioned within a casing 27. The space between the pot and the casing is filled with insulation material 28 to minimize heat loss from the pot. The bottom 29 of the casing 27 is provided with an aperture 30 over which the pot is positioned so that glass streams 31 exuding from the base 22 thereof may pass downwardly in unrestricted flow. The pot inlet 24 extends through an aperture 32 provided in the top 33 of the casing 27.

Glass materials, suitably in the form of marbles, are fed to the pot by means of a metering device 34 positioned above the inlet 24. The metering device suitably includes a pair of vertically aligned solenoids 35 adapted to be electrically actuated by current fed thereinto by lines 36. Each solenoid 35 is fitted with a solenoid rod 37 adapted to be inserted into the vertically disposed marble conduit 38 and upon alternate actuation of said rods, marbles are admitted individually into the melting pot.

Molten glass produced within the melting pot by the heat applied thereto from the coil 25 exudes downwardly through a plurality of orifices or tips 39 in the base of the pot as small molten streams 31. These are attenuated and drawn out into fine fibers 40 which are gathered together as a strand 41 by means of fiber gathering guide 42. The guide is suitably comprised of a felt pad 43 stretched over a shaped metal holder 44. A lubricant is applied to the felt pad from a nozzle 45.

The strand is directed downwardly and is wound on a rotatable tube 46. A motor 47 is supported upon a suitable base and is provided with a rotatable shaft 48 upon which the tube is positioned. The strand is directed back and forth across the face of the tube by a traverser 49 in the manner of a spool of household sewing thread.

By reference to Fig. 2, which is a bottom plan view of a melting pot 20 adapted to be used in the apparatus illustrated in Fig. 1, it will be seen that the bottom 22 of the pot 20 is provided with a plurality of tips 39 arranged in concentric array. As previously mentioned, a small stream of molten glass is exuded downwardly through each of the tips for the formation of a fiber 40.

As shown in Fig. 3, the tips 39 are in the form of elongated cylindrical projections 50 which extend outwardly beyond the outer surface 51 of the bottom 22 of the melting pot 20. Each tip 39 is provided with a cylindrical bore 52 through which the molten glass flows. The glass extudes through the bore 52 of the tip 39 and collects as a small cone 53 from about 3/16 to 1/4 inch in length at the tip extremity 54, from which the fibers are attenuated.

A heat reflective shield 55 is positioned in spaced relation from the bottom 22 of the melting pot 20 and in surrounding relation to each one of the tips 39. It will be noted that the tips are of inverted cone-like configuration, that is, their side walls are provided with downwardly tapered outer surfaces. In effect the tip is an inverted frustum of a cone. The shield 55 is suitably fabricated of annular disk-like shape and is provided with apertures 56 matching each of the tips 39. The shield is suitably press fitted onto the tips in a manner such that it is spaced approximately 1/16 to 1/4 inch away from the outer surface 51 of the bottom 22 of the melting pot.

It will thus be seen that the shield is interposed between the bottom of the melting pot and the extremities 54 of the tips 39. Thus heat radiated from the bottom of the melting chamber is shielded from the cone of glass formed at the extremity of each of the tips. Having a high reflectivity and a low emissivity, the shield is effective to reflect a large part of the heat radiated from the pot back into the melt thus stabilizing the temperature of the glass in the melting pot adjacent the base 22, and reducing the quantity of heat required to be fed thereto for highest operating efficiency. Also the shield by having a low emissivity factor, appreciably reduces the amount of energy directed toward the cone area from the bottom of the melting chamber and thereby reduces remelt breakouts of the fiber being attenuated and provides improved radiation from the cones to the atmosphere. Thus improved cone cooling is provided.

The shields of the present invention can be made in the form of annular disks as previously mentioned. This form permits a support pad to be inserted through the aperture in the center of the disk for supporting the bottom of the melting chamber against sagging during the melting operation. However, the shape of the shield is not to be restricted. Thus shields in the form of circular disks and multi-sided plates are adapted to be used with round melting pots.

Figs. 4 to 10 illustrate additional modifications of the present invention as applied to rectangular melting pots and also to circular pots. As shown in Fig. 4, there is illustrated a glass melting pot 57 of rectangular horizontal cross section which is also adapted to the production of continuous glass fibers. This melting pot 57 includes upwardly extending side walls 58 joined at their ends by upwardly extending end walls 59. The bottom 60 of the pot is in the form of a rectangular plate provided with a plurality of tips 61 similar to those described for the embodiment of Figs. 2 and 3. Molten streams of glass are exuded through the tips for attenuation into fibers 62. The melting pot is also provided with a top 63, of rectangular shape, and having an upwardly extending inlet 64 therein for the receipt of glass materials.

Each end 59 of the melting pot 57 is provided with a lug 65 or electrical terminal to which an electric line 66 is connected. Thus electricity can flow through the melting pot, from end to end, and thereby heat the pot by resistance.

The radiation shield 67 is in the form of a plate of rectangular shape and is provided with a plurality of holes 68 adapted to mate with each of the tips 61 but being of slightly greater diameter than the tips so as not to contact them. Thus there will be no current flow through the shield and it will not be heated by resistance.

As an optional feature the shield 67 may be provided with a fluid conduit 69 secured along one or more of the edges thereof. Thus in addition to reflecting heat this shield can act as a cold body to which heat from the cone area can be radiated.

As illustrated in Fig. 5, a small amount of cement 70 is placed in the opening in the shield between the tip and shield. This embodiment can also be cooled if so desired.

In Fig. 6 there is shown in bottom plan view a segmented shield 71, provided on a resistance heated rectangular pot of the type shown in Fig. 4. The shield is segmented to break the flow of current therethrough. As shown in Fig. 7 the shield segments 72 are press fitted upon the sloping walls of the tips 61.

In Fig. 8 there is illustrated a segmented shield 73 as adapted for use with a round melting pot 74 adapted to be heated by gas firing. In this modification it will be noted in contrast to the modification of Fig. 2 that the tips 75 are radially aligned and that each of the circular rows contains the same number of tips. Thus the same amount of glass will flow from each of the rows. As shown in Fig. 9 the segments 76 are press fitted upon the tips 75 at a desired spacing from the bottom 77 of the glass melting pot 74.

As shown in Fig. 10 a modification of a shield adapted for use with a round melting pot 20 is adapted to be fluid cooled. A fluid conduit 78 is formed on the periphery of the shield 79 and a fluid is circulated therethrough in the direction indicated by the arrows. Fig. 11 shows in section how the fluid conduit 78 is formed on the outer periphery of the shield 79. Also as shown in Fig. 11 the shield is press fitted upon the tips 80.

Also it is to be considered within the scope of the invention to provide one or more shields spaced along the length of the tips to provide a multiplicity of radiation barriers.

Radiation shields made in accordance with the present invention are fabricated of materials of high reflectivity and low emissivity. Materials from which the present shields can be made are required to withstand temperatures encountered adjacent the bottom of the glass melting chamber which operates at about 2000° F. or higher.

Shields which are placed in direct contact with the bottom of the melting pot or the tips must be able to withstand these temperatures. However, when employing a plurality of shields the outer one can be of considerably lower melting temperature because it will be shielded from the melting pot by an adjacent higher temperature-resistant shield. It has been preferred to employ high temperature resistant alloys such as made from the precious metals. Thus platinum-rhodium alloys are suitable and generally preferred. Also gold, silver and aluminum and the like are considered to be within the scope of the invention. Also, materials such as asbestos can be fabricated in sheet form and coated on one or both surfaces with a reflective metal such as platinum, gold or other, and used for a shield in accordance with the present invention. The high temperature resistant alloys such as stainless steel can also be used.

It will thus be seen that the present invention provides a glass melting chamber wherein the fiber forming area is shielded from radiant heat energy from the bottom of the melting chamber.

A number of advantages accrue from the present invention. Radiant heat emanating from the bottom of the melting chamber is reflected back into the melt to stabilize temperatures within the molten glass contained in the melting chamber. At the same time the cone cooling rate is greatly increased and rendered more uniform. In actual operation shields made in accordance with the present invention have been found to operate between 200 and 500 degrees cooler than the bottom of the glass melting chamber. A further advantage arising from shields made in accordance with the present invention which are placed in contacting relation with the tips is that any temperature differential between tips is leveled out. Thus uniformity of glass output through the tips is improved.

Another advantage arising from the use of a fluid cooled shield made in accordance with the present invention is that controlled radiation absorption from the cone area can be effected when desired.

In accordance with the present invention the production of continuous glass fibers is greatly improved. Such improvement results from the reduction of interruptions caused by severance of the weak fibers by remelts because radiation to the cone area from the bottom of the pot is lowered to a point where remelting of the fibers does not occur.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

We claim:

1. A glass melting chamber having a wall adapted to contain molten glass, said wall being provided with an external projection defining an orifice through which molten glass is exuded, and a heat reflective member positioned in surrounding relation to said projection and spaced from said wall, said heat reflective member being adapted to primarily deter radiant heat transfer from said wall to the extremity of said projection.

2. A glass melting chamber having a wall adapted to contain molten glass, said wall having an outer surface and a projection extending outwardly therefrom, said projection defining an orifice through which molten glass is exuded, and a heat reflective member positioned in surrounding relation to said projection and in spaced relation with said outer surface to primarily deter radiant heat transfer from said outer surface to the extremity of said projection.

3. A glass melting chamber having a wall adapted to contain molten glass, said wall having an outer surface and a projection extending outwardly therefrom, said projection defining an orifice through which molten glass is exuded, and a member having high heat reflectivity and low heat emissivity properties, said member being positioned in surrounding relation to said projection and spaced from said outer surface to primarily deter radiant heat transfer from said outer surface to the extremity of said projection.

4. A glass melting chamber having a horizontally extending base adapted to retain molten glass, said base having an external vertically extending projection defining an orifice through which molten glass is exuded, said projection having an outer terminus, and a heat reflective plate member intermediate said terminus and said base positioned in surrounding relation to said projection to primarily deter radiant heat transfer from said base to said terminus.

5. A glass melting chamber having a wall adapted to retain molten glass, said wall having an external projection defining an orifice through which molten glass is exuded, said projection having an outer terminus, and a heat reflective plate member intermediate said terminus and said wall positioned in surrounding relation to said projection to primarily deter radiant heat transfer from said wall to said terminus.

6. A glass melting chamber having a wall adapted to contain molten glass, a plurality of projections extending from said wall, each of said projections defining an orifice, and a heat reflective member defining a plurality of apertures, there being an aperture for each of said projections, said member being spaced from said wall and circumposing each of said projections to shield and deter radiant heat transfer from said wall to the extremities of said projections.

7. A glass melting chamber as defined in claim 1, wherein said member is fabricated from a metal of high heat reflectivity and low heat emissivity.

8. A glass melting chamber as defined in claim 1, wherein said member is fabricated from a fibrous mineral material coated with a metal of high heat reflectivity and low heat emissivity.

9. A glass melting chamber as defined in claim 5, wherein said member is fabricated from a metal of high heat reflectivity and low heat emissivity.

10. A glass melting chamber as defined in claim 5, wherein said member is fabricated from a mineral material coated with a metal of high heat reflectivity and low heat emissivity.

11. A glass melting chamber as defined in claim 10, wherein said mineral material is fibrous in form.

12. A glass melting chamber as defined in claim 5, wherein said member is fabricated of an alloy of platinum.

13. A glass melting chamber as defined in claim 5, in which the said wall, orifice and plate member are fabricated of a high temperature-resistant precious metal alloy.

14. A glass melting chamber as defined in claim 5, in which the side wall of said melting chamber is fabricated of a high temperature-resistant refractory clay and in which the aperture and heat reflecting plate are fabricated of a high temperature-resistant precious metal alloy.

15. A glass melting chamber having a wall adapted to contain molten glass, an orifice in said wall through which molten glass is exuded, said orifice projecting outwardly from said wall and having a terminus spaced from said wall, a plate member of high heat reflectivity and low heat emissivity positioned in surrounding relation to said orifice in spaced relation between said wall and said terminus, and means for cooling said plate member from the periphery thereof.

16. A glass melting chamber having a wall adapted to contain molten glass, an orifice in said wall through which molten glass is exuded, said orifice projecting outwardly from said wall and having a terminus spaced from said wall, a plate member of high heat reflectivity and low heat emissivity positioned in surrounding relation to said orifice in spaced relation between said wall and said terminus, and means for fluid cooling said plate member from the periphery thereof.

References Cited in the file of this patent

UNITED STATES PATENTS

| | | |
|---|---|---|
| Re. 24,060 | Russell | Sept. 6, 1955 |
| 2,121,802 | Kleist et al. | June 28, 1938 |
| 2,165,318 | Thomas et al. | July 11, 1939 |
| 2,215,982 | Slayter et al. | Sept. 24, 1940 |
| 2,335,135 | Staelin | Nov. 23, 1943 |
| 2,489,508 | Stalego | Nov. 29, 1949 |
| 2,535,888 | Billman | Dec. 26, 1950 |
| 2,706,365 | Stalego | Apr. 19, 1955 |
| 2,775,850 | Stalego | Jan. 1, 1957 |

FOREIGN PATENTS

| | | |
|---|---|---|
| 449,233 | Germany | Sept. 7, 1927 |
| 436,250 | Great Britain | Oct. 7, 1935 |
| 605,001 | Great Britain | July 14, 1948 |
| 724,404 | Great Britain | Feb. 23, 1955 |